(12) United States Patent
Binder et al.

(10) Patent No.: US 11,906,047 B2
(45) Date of Patent: Feb. 20, 2024

(54) CLAW-TYPE GEARSHIFT AND METHOD OF SHIFTING A CLAW-TYPE GEARSHIFT

(71) Applicant: Hoerbiger Antriebstechnik Holding GmbH, Schongau (DE)

(72) Inventors: Juergen Binder, Schongau (DE); Werner Fuerguth, Schongau (DE); Andreas Dempfle, Schongau (DE); Wolfgang Voelk, Schongau (DE); Thomas Schnelzer, Schongau (DE); Peter Echtler, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 18/050,198

(22) Filed: Oct. 27, 2022

(65) Prior Publication Data
US 2023/0133619 A1 May 4, 2023

(51) Int. Cl.
*F16H 63/30* (2006.01)
*F16H 61/04* (2006.01)
*F16H 63/04* (2006.01)

(52) U.S. Cl.
CPC ......... *F16H 63/30* (2013.01); *F16H 61/0403* (2013.01); *F16H 63/04* (2013.01); *F16H 2063/3093* (2013.01)

(58) Field of Classification Search
CPC ...... F16H 63/30; F16H 61/0403; F16H 63/04; F16H 2063/3093; F16H 2055/178; F16D 23/06; F16D 23/025; F16D 2023/0631; F16D 2023/0637; F16D 2023/0643; F16D 23/02; F16D 23/04; F16D 2023/0681; F16D 2011/002
See application file for complete search history.

(56) References Cited

U.S. PATENT DOCUMENTS 5,657,844 A * 8/1997 Wagner ................... F16D 23/06
192/53.32

* cited by examiner

*Primary Examiner* — Victor L MacArthur
(74) *Attorney, Agent, or Firm* — McNees Wallace & Nurick LLC (57) ABSTRACT

A claw-type gearshift includes a sliding sleeve and a clutch body of a speed change gear, in which the sliding sleeve can engage. A blocking ring having an external toothing is arranged axially between the hub body and the clutch body and is fixed to the hub body such that it is rotatable in relation to the sliding sleeve by a certain degree in the circumferential direction between a release position and two locking positions. The blocking ring has a plurality of axially resilient tabs which are directed radially inward and which bear against the hub body and limit the movement of the blocking ring relative to the hub body in the circumferential direction, and a ring portion which is arranged radially outside of the tabs and which includes a friction surface that rests permanently against a mating friction surface on the clutch body.

11 Claims, 6 Drawing Sheets

CLAW-TYPE GEARSHIFT AND METHOD OF SHIFTING A CLAW-TYPE GEARSHIFT

TECHNICAL FIELD

The disclosure relates to a claw-type gearshift and a method of shifting a claw-type gearshift. The claw-type gearshift is provided in particular for a manual transmission of a vehicle.

BACKGROUND

Claw-type gearshifts, i.e. shiftable claw clutches, have the drawback in motor vehicles that vibrations and noise may occur during engagement of the two coupling elements with each other when there are rotational speed differences.

The object of the disclosure is to provide a claw-type gearshift in which noise generation and wear are reduced.

SUMMARY

The claw-type gearshift according to the disclosure includes a sliding sleeve which is adapted to be axially displaced on a hub body and includes an internal toothing having a multitude of sliding sleeve teeth, and a clutch body of a speed change gear, which includes an external toothing which has a multitude of clutch body teeth and is adapted to engage in the internal toothing of the sliding sleeve. Further provided is a blocking ring which has an external toothing and is arranged axially between the hub body and the clutch body and which is fixed to the hub body such that it is rotatable in relation to the sliding sleeve by a certain degree in the circumferential direction between a release position and two locking positions, the locking positions being located on either side of the release position in the circumferential direction. The blocking ring includes a plurality of axially resilient tabs which are directed radially inward and which bear against the hub body and limit the movement of the blocking ring in relation to the hub body in the circumferential direction, and a ring portion which is arranged radially outside of the resilient tabs and which includes a friction surface that rests permanently against a mating friction surface on the clutch body.

Similar to a synchronizer ring of a known synchronized gearshift, in this entirely different application the blocking ring prevents the sliding sleeve from striking the clutch body at a high differential speed. The blocking ring allows the sliding sleeve toothing to engage with the clutch body toothing only after an adaption of the speeds, which, however, preferably is not effected by the blocking ring itself, but away from the claw-type gearshift. In this way, noise generation and component wear are significantly reduced.

As soon as there is a difference in speed between the clutch body and the hub body, the clutch body acts on the blocking ring in the circumferential direction due to the permanent frictional connection, so that the blocking ring changes over to one of its locking positions. A speed difference is practically always present unless a shifting operation is currently being performed. In contrast to known synchronized gearshifts, the blocking ring is therefore normally in one of the two locking positions prior to the shifting operation.

There is therefore no need for the blocking ring to be deflected by the sliding sleeve in order to move the blocking ring into contact with the clutch body and cause it to switch over to the locking position. In particular, no thrust pieces are provided on the hub body either. This reduces the axial installation space of the claw-type gearshift and lowers manufacturing costs.

In further contrast to the known synchronized gearshifts, generally no provision is made for the sliding sleeve to be able to actively return the blocking ring to its release position in order to allow engagement. The blocking ring preferably constitutes a form-locking blockade for the sliding sleeve against a displacement of the sliding sleeve teeth between the clutch body teeth when an axial shifting force is applied in the non-synchronized state. For this purpose, in particular the blocking ring teeth and the sliding sleeve teeth are formed such and located opposite each other in the locking position such that when a shifting force has been applied axially, the sliding sleeve cannot return the blocking ring to the release position. For example, the axial ends of the blocking ring teeth and the sliding sleeve teeth that meet are flattened. Also, as extensive an overlap as possible of the blocking ring teeth and the sliding sleeve teeth in the circumferential direction in the locking position may contribute to ensuring that, with an axial shifting force applied, the resulting force components in the circumferential direction remain so small that no rotation of the blocking ring back to the release position occurs.

Returning the blocking ring is preferably effected by a rotational speed crossing, that is, a change in direction of the relative rotational speed of the clutch body and the hub body after a zero crossing.

There are two possible scenarios for this. For one thing, the relative rotational speed experiences a change in direction when one component, that is, the clutch body or the hub body, which was previously leading the other, now lags behind it, but both components maintain their previous absolute direction of rotation. For another thing, the relative rotational speed also changes direction when one of the components, that is, the clutch body or the hub body, changes its absolute direction of rotation.

In either case, the friction torque also undergoes a change of direction.

Particularly good locking is achieved when the tooth centers of the blocking ring teeth and the sliding sleeve teeth are opposite each other in each of the locking positions as viewed in the axial direction, that is, when the tooth centers are in the same position in the circumferential direction. The occurrence of lateral force components that might cause a rotation of the blocking ring to the release position can be minimized in this way.

In the release position, the tooth centers of the blocking ring teeth are then correspondingly located centrally in the tooth gaps of the internal toothing of the sliding sleeve.

Preferably, the blocking ring is fixed to the hub body by means of the axially resilient tabs, which engage by their free ends in coupling grooves in a side surface of the hub body. Both the limitation of rotation in the circumferential direction and the spring action in the axial direction can be predefined by the configuration of the tabs, which simplifies the shape of the blocking ring. In particular, the frictional force acting between the ring portion and the clutch body can be adjusted by the angle of the axially resilient tabs and the length thereof. The angle is preferably chosen to be very acute, for example about 5 degrees to 15 degrees in relation to the radial direction. The tabs may have a length of about one to two times that of the ring portion in the radial direction.

In one possible variant, the axial ends of the blocking ring teeth all have a flat configuration, i.e. they have no portion that protrudes in the axial direction, and they form a flat, radially oriented surface, thus reducing manufacturing costs.

The friction surface of the blocking ring is formed, for example, on a circumferentially encircling V-shaped projection on the ring portion and the mating friction surface on the clutch body is formed on a circumferentially encircling V-shaped depression, the projection and the depression engaging in one another. Both legs of the V can be part of the friction surface, resulting in two cone-shaped partial friction surfaces, which significantly increases the frictional force compared to a planar friction surface. This ensures that the frictional forces between the blocking ring and the clutch body are always higher than the frictional forces between the axial ends of the sliding sleeve teeth and the blocking ring teeth, so that the changeover movement of the blocking ring to the release position cannot be influenced by the sliding sleeve teeth.

The V-shaped projection on the blocking ring can be implemented in a simple manner by a bead in the ring portion.

In another variant, the friction surface on the blocking ring and the mating friction surface on the clutch body are radially oriented and planar. Such a blocking ring has a very narrow design in the axial direction and is cost-effective to manufacture.

In order to reduce friction between the blocking ring and the sliding sleeve, pointing surfaces may be provided here, in particular at the axial ends of some or all of the blocking ring teeth and/or the sliding sleeve teeth, the pointing surfaces having an opening angle perpendicular to a tooth longitudinal direction in the axial direction which is equal to or smaller than 7 degrees.

These pointing surfaces serve to reduce the frictional forces between the sliding sleeve and the blocking ring in the circumferential direction to a value that is smaller than the frictional force between the friction surface of the blocking ring and the mating friction surface of the clutch body. This is effected by the reduction in size of the contact area between the blocking ring teeth and the sliding sleeve teeth.

In this context, the opening angle is to be selected to be so small that the frictional forces acting between the sliding sleeve and the blocking ring in the axial direction are always greater than the force that is generated by an axial shifting force and seeks to rotate the blocking ring in the circumferential direction.

The opening angle is in the range of the respective self-locking angle of the material pairing between the blocking ring and the sliding sleeve. For example, for a steel-on-steel frictional contact, the coefficient of friction $\mu$ amounts to 0.1, resulting in a self-locking angle of 5.7 degrees. Compared with the engagement slopes of about 60 degrees conventionally used in synchronizer rings, this means that the pointing surfaces are formed with an extremely small angle.

It has been found that with an opening angle equal to or smaller than 7 degrees, it is made sure for all common material pairings and normal shifting forces that the sliding sleeve is not capable of rotating the blocking ring from its locking position back to the release position.

The axial ends of the blocking ring teeth and the sliding sleeve teeth are thus either flat or provided with pointing surfaces.

Since in a claw clutch the sliding sleeve teeth and the clutch body teeth are normally formed without engagement slopes, the axial installation space required for the claw-type gearshift is reduced.

In general, the friction surface and/or the mating friction surface may be formed only by the surface of the material of the blocking ring or of the clutch body, if necessary with a suitable structuring, for example a grooved structure. In addition, one or both of the friction surfaces may also be provided with a friction-enhancing and/or wear-reducing coating.

The above-mentioned object is also achieved by a method of shifting a claw-type gearshift, in particular a claw-type gearshift as described above. The claw-type gearshift includes a sliding sleeve adapted to be axially displaced on a hub body, a clutch body of a speed change gear, which is adapted to move into engagement with the sliding sleeve, and a blocking ring arranged axially between the hub body and the clutch body. Due to the permanent frictional connection between the friction surface of the blocking ring and the mating friction surface of the clutch body, the blocking ring switches over to one of two locking positions in the circumferential direction. This occurs in particular even before the initiation of a shifting operation. In the actual shifting operation, a difference in speed between the clutch body and the hub body is reduced, a shifting force is applied, and the sliding sleeve is displaced in the axial direction toward the speed change gear to be shifted. The blocking ring switches over to the release position in the circumferential direction when a change in direction of the relative rotational speeds of the clutch body and the hub body occurs, and the internal toothing of the sliding sleeve is engaged with the external toothing of the clutch body.

The blocking ring exerts a spring force in the axial direction that presses the friction surface against the mating friction surface to maintain the frictional force between the blocking ring and the clutch body at all times, both during and outside a shift operation.

Returning the blocking ring to the release position is effected exclusively by the blocking ring being entrained by the clutch body or the hub body when one of these components experiences a rotational speed crossing, that is, changes its direction of rotation.

As long as the hub body and the clutch body rotate in the same direction at differential speeds, the blocking ring preferably blocks an axial further movement of the sliding sleeve irrespective of the shifting force acting.

If a tooth-on-tooth position occurs at the first contact between the sliding sleeve teeth and the clutch body teeth, a relative rotation between the hub body and the clutch body, which allows the internal toothing of the sliding sleeve to engage with the external toothing of the clutch body, is advantageously achieved by a speed difference between the hub body and the clutch body that builds up after rotational speed crossing. Normally, a small speed difference necessarily arises after only a short time following rotational speed crossing. Therefore, the clutch body and the sliding sleeve will automatically move to a tooth-on-gap position.

At this point in time, the blocking ring is already in its release position and no longer blocks the sliding sleeve. It is also of advantage that the speed adaption need not be designed such that it results in completely identical speeds of the hub body and the clutch body.

In particular, the adaption of the speeds of the hub body and the clutch body is not effected by the blocking ring, but through a device which is separate from the blocking ring and can be implemented at a suitable location in the vehicle away from the claw-type gearshift.

The speed adaption is preferably initiated before the shifting force is applied and the sliding sleeve is moved, so that the blocking ring does not come into contact with the clutch body until the speeds have already been largely matched. The blocking ring therefore has to withstand only very small speed differences when it is axially acted on by the sliding sleeve, so it can be constructed significantly thinner than a conventional synchronizer ring, which saves both axial installation space and material.

DETAILED DESCRIPTION

For the sake of clarity, where components are shown more than once in the drawings, not all of them are provided with reference numbers.

The claw-type gearshift 10 illustrated in the Figures, which is designed here for a manual transmission of a motor vehicle, serves to optionally connect a rotatable shaft to a speed change gear (not shown) for joint rotation therewith. The shaft carries a hub body 12, which is connected to said shaft for joint rotation therewith, while a clutch body 14 is attached to the speed change gear for permanent joint rotation therewith.

The hub body 12 includes an external toothing 16 that is permanently in engagement with an internal toothing 18 of a sliding sleeve 20 that surrounds the hub body 12 in the circumferential direction U.

The sliding sleeve 20 is displaceable in the axial direction A by a certain degree to either side of the hub body 12, with the toothings 16, 18 remaining in engagement with each other at all times. The sliding sleeve 20 is axially displaceable so far that the internal toothing 18 comes to engage in an external toothing 22 of the clutch body 14.

Figure 1:
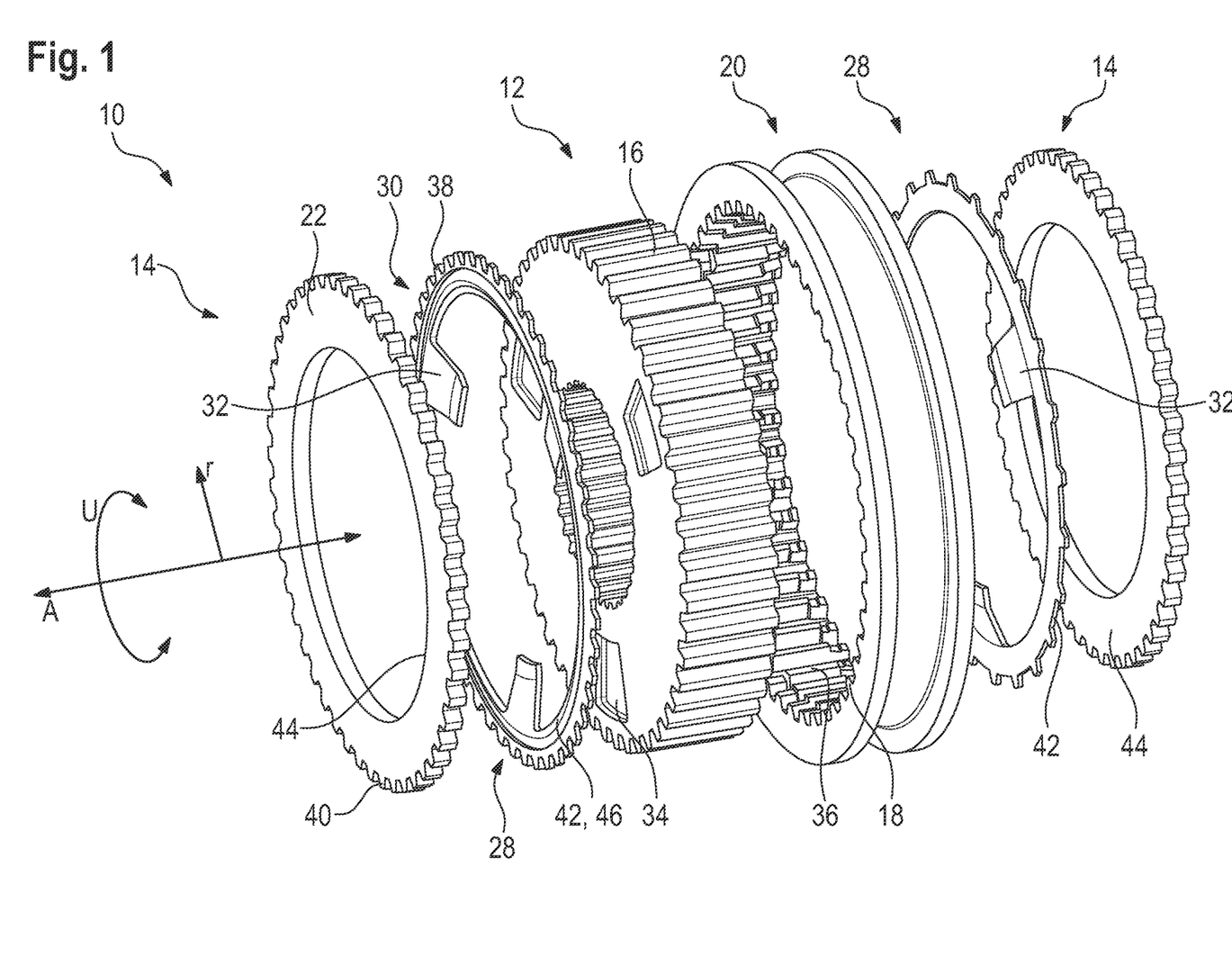
FIG. 1 shows a schematic exploded view of a claw-type gearshift according to the disclosure for carrying out a method according to the disclosure, in two possible variants.

As is illustrated in FIG. 1, as a rule, two speed change gears, each with a clutch body 14, are arranged on either side of the hub body 12 so that two gears can be shifted by the axial movement of the sliding sleeve 20.

In the axial direction A, a respective blocking ring 28 having an external toothing 30 is arranged between the clutch body 14 and the hub body 12.

The blocking ring 28 has several, in this case three, axially resilient tabs 32 which are directed radially inwards and are distributed over its circumference and the free ends of which are in permanent engagement with corresponding coupling grooves 34 in a side surface of the hub body 12. The coupling grooves 34 are made to be so wide in the circumferential direction U that the tabs 32 can shift by a certain angular measure in both directions and thus the blocking ring 28 can rotate to two locking positions in relation to a central release position. In each of the locking positions, the tabs 32 rest against a circumferential edge of the coupling grooves 34.

The tabs 32 are integrally connected with a radially outer ring portion 35, on which the external toothing 30 is arranged.

The angle at which the tabs 32 extend from the ring portion 35 to their free ends in the coupling grooves 34 is very acute in relation to the radial direction r, e.g. between 5 degrees and 15 degrees. The length of the tabs 32 here is about one to two times the radial width of the ring portion 35.

The toothings 18, 22, 30 of the sliding sleeve 20, the clutch body 14 and the blocking ring 28 all have dimensions that are matched to each other, so that the sliding sleeve teeth 36 can engage between the blocking ring teeth 38 and the clutch body teeth 40.

Here, the blocking ring teeth 38 have roughly the same dimensions in the circumferential direction U as the clutch body teeth 40; in the release position, the tooth gaps of the external toothing 30 of the blocking ring 28 and the external toothing 22 of the clutch body 14 are in alignment, and in each of the locking positions, the blocking ring teeth 38 lie in the gaps between the clutch body teeth 40, thus blocking the axial movement of the sliding sleeve 20.

Figure 8:
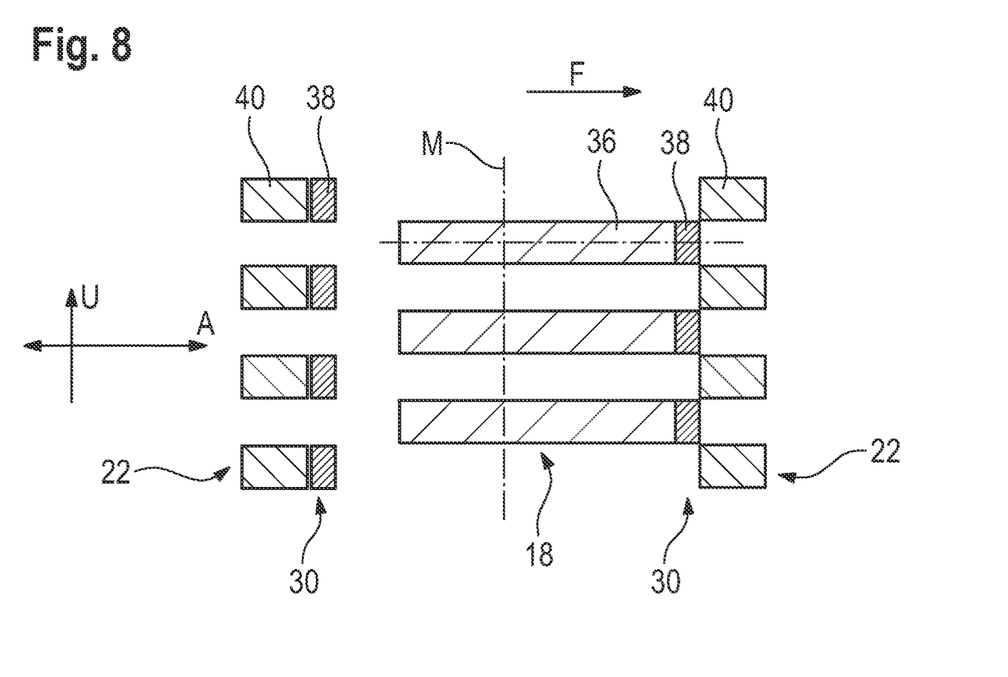
FIG. 8 shows a schematic view of the claw-type gearshift from FIG. 1 in a locked position, with the blocking ring in one of its locking positions.

As shown in FIG. 8, in the locking positions the blocking ring teeth 38 and the sliding sleeve teeth 36 are in the same position in the circumferential direction U. The shifting force F therefore acts centrally on the blocking ring teeth 38.

The angle α between the two locking positions here comprises one tooth spacing (from tooth center to tooth center) of the external toothing 22 of the clutch body 14. In one variant, the external toothing 30 of the blocking ring 28 has exactly as many teeth as that of the clutch body 14, so that this also corresponds to the angular distance between two blocking ring teeth 38 (see, e.g., FIG. 4). In another variant, the blocking ring teeth 38 are spaced further apart from each other than the clutch body teeth 40 (see, e.g., FIG. 5). The clearance of the tabs 32 in the coupling grooves 34 in the circumferential direction U accordingly amounts to an angle that corresponds to one tooth spacing of the external toothing 22 of the clutch body 14.

On its side facing the clutch body 14, the blocking ring 28 is provided with a friction surface 42, which is in permanent contact with a mating friction surface 44 on the clutch body 14.

FIGS. 1 to 5 show two different variants for the configuration of the friction surface 42 and the mating friction surface 44. In the variant shown on the left-hand side of each of FIGS. 1, 2, 3 and in FIG. 4, the ring portion 35 of the blocking ring 28 has a circumferentially encircling V-shaped projection 46, which engages in a circumferentially encircling V-shaped depression 48 on the clutch body 14. The friction surface 42 and the mating friction surface 44 are each arranged on both legs of the V.

Figure 4:
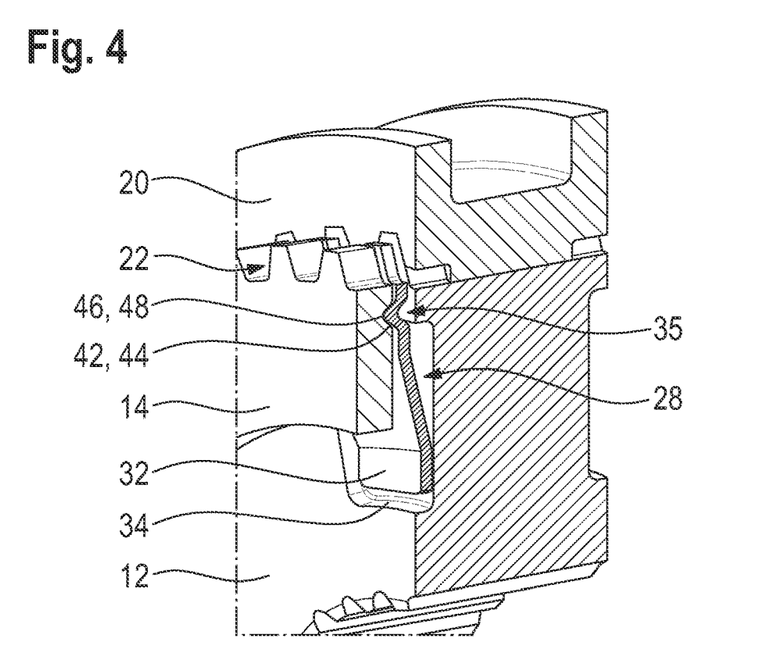

In this variant, all of the blocking ring teeth 38 are formed to be axially flat (see also FIG. 4). Because of the V-shaped friction surfaces 42, 44, the friction that is generated between the blocking ring 28 and the clutch body 14 is always higher than a frictional force between the internal toothing 18 of the sliding sleeve 20 and the blocking ring toothing 30 when the sliding sleeve 20 comes into contact with the blocking ring 28 during the shifting operation.

Figure 2:
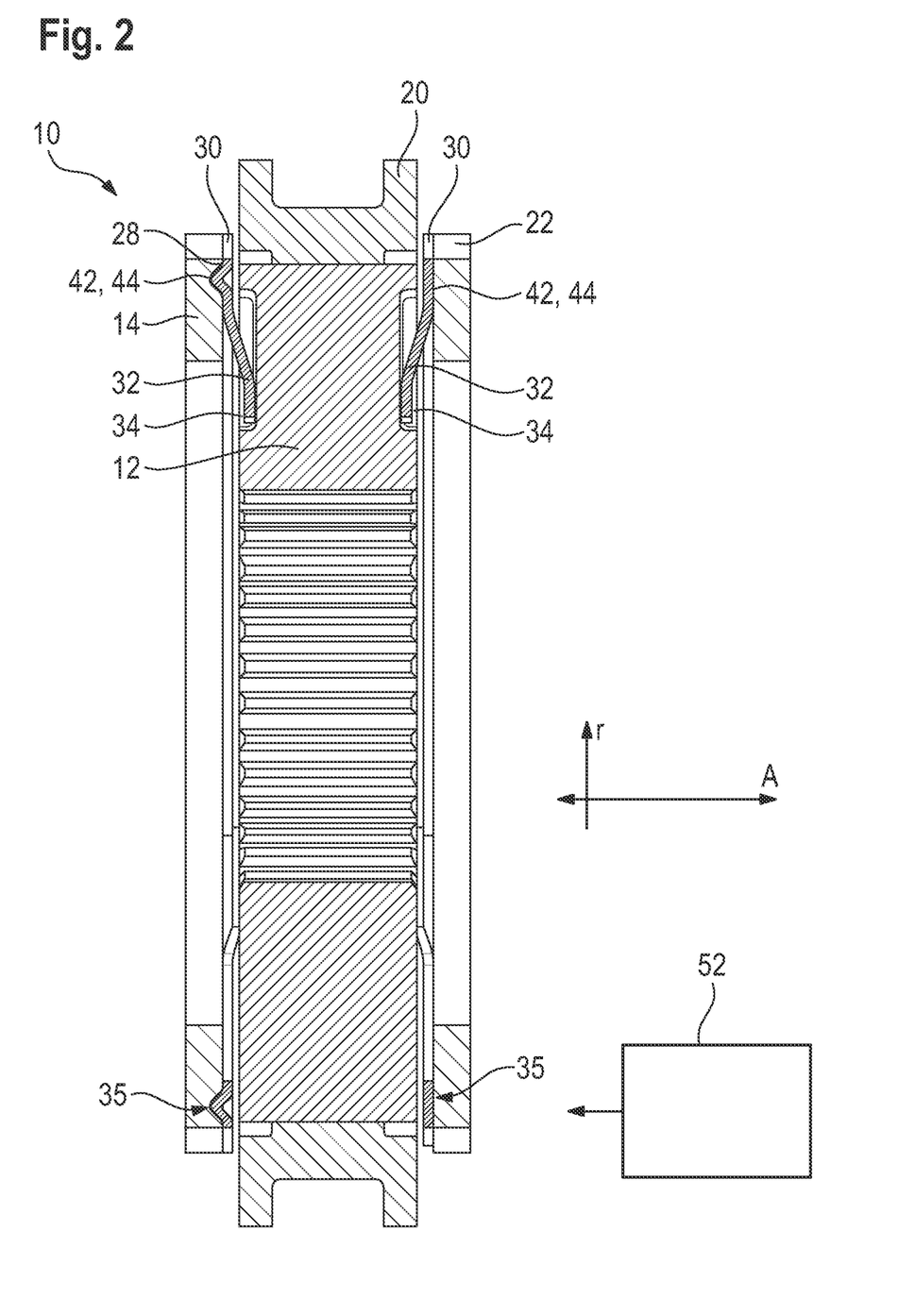
FIG. 2 shows a schematic partly sectional view of the claw-type gearshift of FIG. 1.
Figure 3:
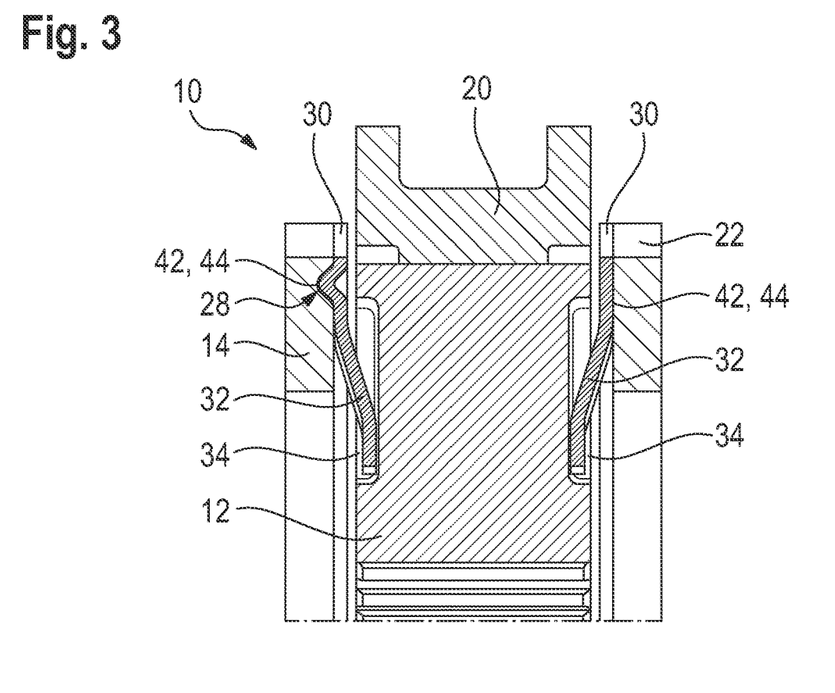
FIGS. 3 to 5 show schematic views of the two variants of the claw-type gearshift of FIG. 1.
Figure 5:
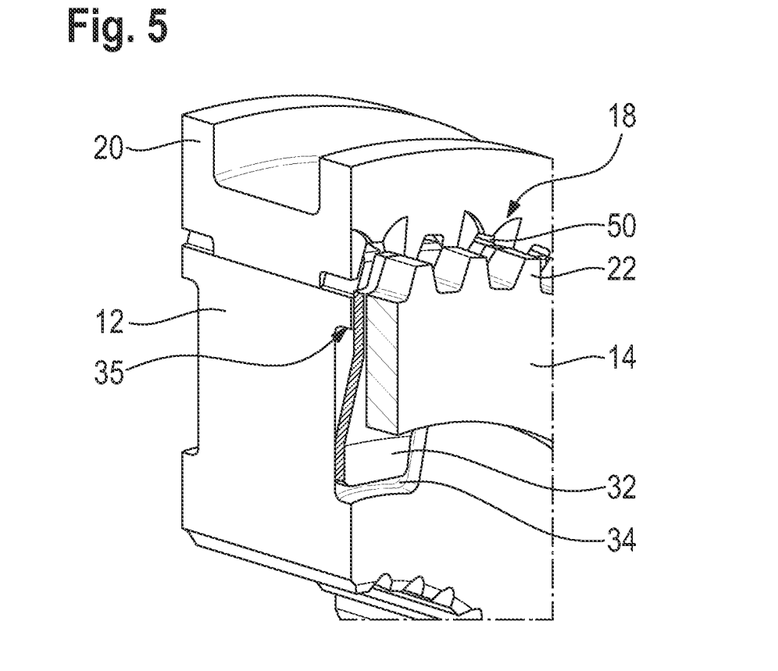

In the variant shown on the right-hand side of each of FIGS. 1, 2, 3 and in FIG. 5, both the friction surface 42 and the mating friction surface 44 are flat and extend exclusively in the radial direction r and in the circumferential direction U.

Figure 6:
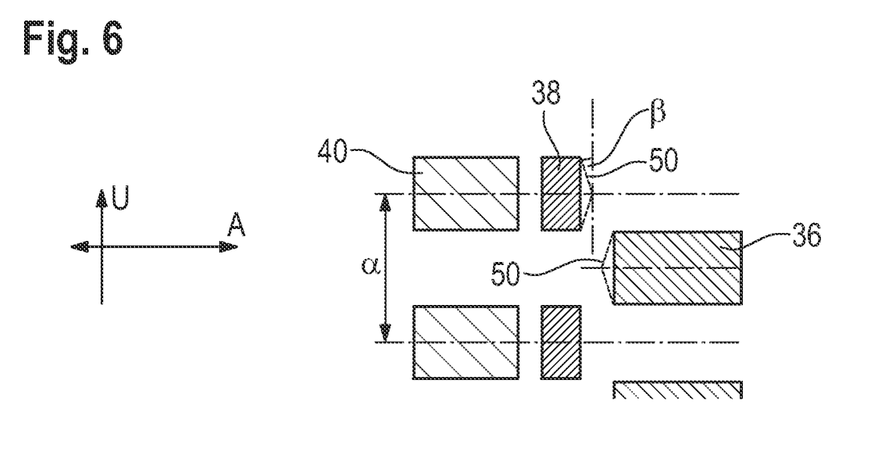
FIG. 6 shows a schematic view of a variant of the shape of the blocking ring teeth and the sliding sleeve teeth of the claw-type gearshift of FIG. 1.

To reduce the friction between the sliding sleeve 20 and the blocking ring 28, the sliding sleeve teeth 36 are here provided with axial pointing surfaces 50 having an opening angle β perpendicular to the tooth longitudinal direction and the axial direction A in the range of the respective self-locking angle of the material of the sliding sleeve 20 and the blocking ring 28, in particular equal to or smaller than 7 degrees (see also FIG. 6).

It would be possible to provide pointing surfaces 50 also at the axial ends of the blocking ring teeth 38, which are directed toward the sliding sleeve 20.

The axial ends of the clutch body teeth 40 are always flat here.

It is not intended that the sliding sleeve 20 can actively rotate the blocking ring 28 back to its release position. When the blocking ring 28 is in one of the locking positions, the sliding sleeve 20 is prevented from moving axially further toward the associated clutch body 14, irrespective of the axial shifting force applied.

The blocking ring teeth 38 and also the sliding sleeve teeth 36 as well as the clutch body teeth 40 are formed entirely without engagement slopes.

Figure 7:
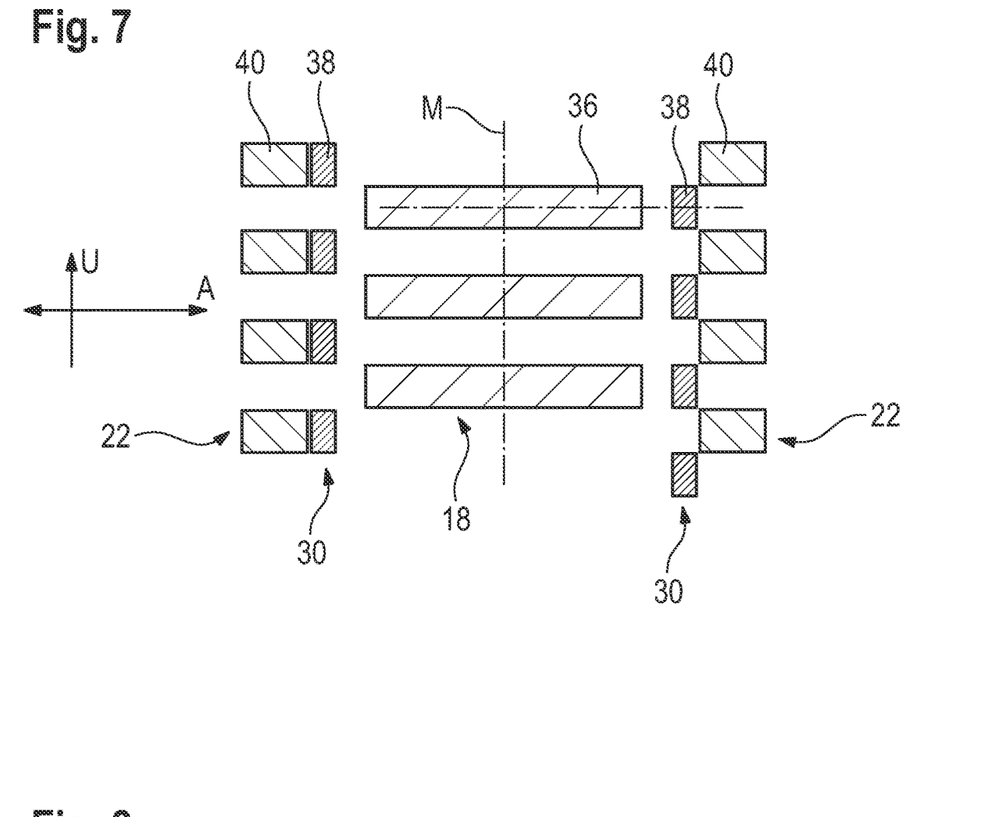
FIG. 7 shows a schematic view of the claw-type gearshift from FIG. 1 in a neutral position, with the blocking ring in one of its locking positions.
Figure 9:
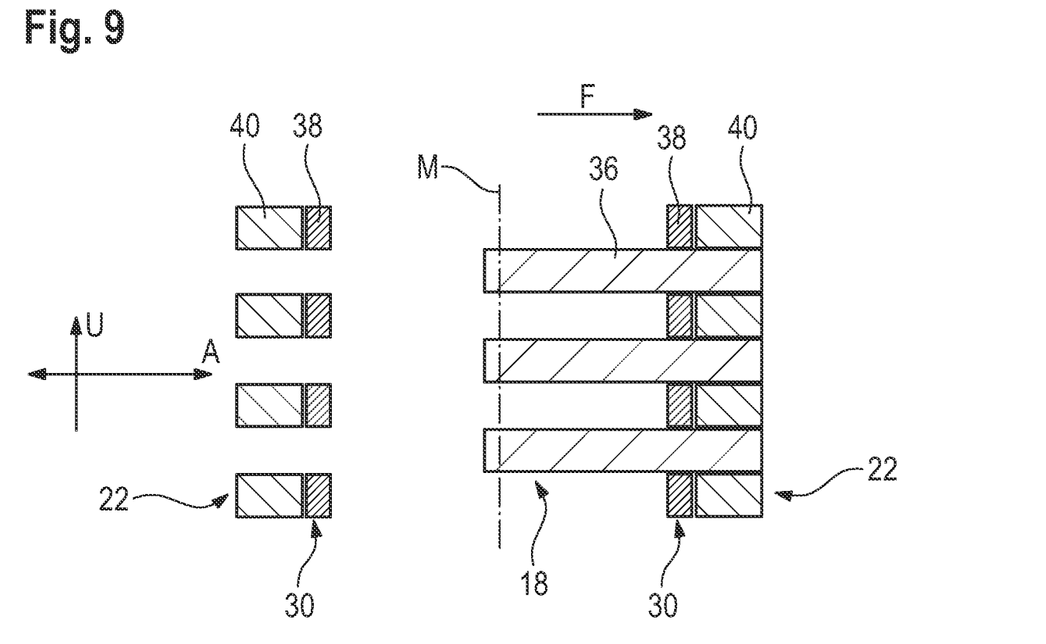
FIG. 9 shows a schematic view of the claw-type gearshift from FIG. 1 in a docking position, in which the blocking ring is in the release position and the sliding sleeve is in engagement with the clutch body.

Referring to FIGS. 7 to 9, the operation of the claw-type gearshift 10 will now be described.

FIG. 7 shows the claw-type gearshift 10 in a neutral position. The sliding sleeve 20 and the clutch body 14 are axially spaced apart from each other and do not touch. The blocking ring 28 rests by its friction surface 42 against the mating friction surface 44 of the clutch body 14. Therefore, a frictional force acts between the friction surfaces 42, 44. Since the rotational speeds between the clutch body 14 and the hub body 12 are usually different outside of an ongoing shifting process, the blocking ring 28 is acted upon in the circumferential direction U and is therefore switched over to one of its two locking positions.

The sliding sleeve 20 is located centrally between the two clutch bodies 14, which is illustrated by the dashed centerline M in FIG. 7.

The sliding sleeve teeth 36 are located in the gaps of the toothing 22 in the circumferential direction U and centrally opposite the blocking ring teeth 38.

For shifting a gear, first the speeds of the hub body 12 and of the clutch body 14 which is to be coupled to the sliding sleeve 20 are largely approximated by a device 52 for speed adaption (shown schematically in FIG. 2). The device 52 may, for example, be coupled to an electric motor of the vehicle and does not comprise the blocking ring 28.

Only when this substantial speed adaption has been effected is an axial shifting force F applied, to the right in the Figures. The sliding sleeve 20 is displaced a short distance in the axial direction A. Since, however, the blocking ring teeth 38 are located in front of the gaps of the external toothing 22 of the clutch body 14 and centrally in front of the sliding sleeve teeth 36 in the circumferential direction U, axial further movement of the sliding sleeve 20 toward the clutch body 14 is prevented as soon as the sliding sleeve teeth 36 come into contact with the blocking ring teeth 38.

The blocking ring 28 does not take over the function of speed adaption between the hub body 12 and the clutch body 14. This is performed practically exclusively by the device 52.

The claw-type gearshift 10 is now in a locked position, in which the sliding sleeve 20 cannot move any further toward the clutch body 14 in the axial direction A.

The amount of frictional force between the friction surface 42 and the mating friction surface 44 here is selected to be higher than the frictional force that now arises between the sliding sleeve 20 and the blocking ring 28. This is achieved, for example, by the cone shape of the friction surface 42 and the mating friction surface 44.

As an alternative, this is ensured by the pointing surfaces 50 already described above (see FIGS. 5 and 6). Owing to the pointing surfaces 50, the surface of contact between the sliding sleeve toothing 18 and the blocking ring 28 is reduced to line contacts, which significantly reduces the frictional force in the circumferential direction U, which is not desirable at this location. In both variants, the sliding sleeve 20 is prevented from possibly entraining the blocking ring 28 in the circumferential direction U, since the frictional force between the blocking ring 28 and the clutch body 14 predominates at all times.

The device 52 further acts to adapt the speeds of the hub body 12 and the clutch body 14. In the process, after a short period of time, a rotational speed crossing will occur, that is, a change in direction of the relative rotational speeds of the hub body 12 and the clutch body 14.

This rotational speed crossing causes a change in direction of the friction torque and therefore causes the blocking ring 28 to switch over to the release position in the circumferential direction U, so that the docking position shown in FIG. 9 is obtained.

The sliding sleeve 20 can now be moved further in the axial direction A, with its internal toothing 18 engaging with the external toothing 22 of the clutch body 14.

The rotational speed crossing is also always accompanied by the build-up of a new, small speed differential between the hub body 12 and the clutch body 14. This ensures that the sliding sleeve 20 and the clutch body 14 automatically move to a position in which the sliding sleeve teeth 36 meet the gaps in the external toothing 22 of the clutch body 14, even if there should be a tooth-on-tooth position at the first contact.

The blocking ring 28 is not involved in this process.

With its compact axial type of construction, the claw-type gearshift 10 allows a low-noise and low-wear shifting, since the movement of the sliding sleeve 20 is blocked until a rotational speed crossing has taken place. The blocking ring 28 used is not employed for speed adaption here and may therefore be manufactured to have a low material thickness.

The invention claimed is:

1. A claw-type gearshift, comprising:
a sliding sleeve which is adapted to be axially displaced on a hub body and includes an internal toothing having a multitude of sliding sleeve teeth, and a clutch body of a speed change gear, the clutch body including an external toothing which has a multitude of clutch body teeth and is adapted to engage in the internal toothing of the sliding sleeve, and
a blocking ring which has an external toothing and is arranged axially between the hub body and the clutch body and which is fixed to the hub body such that the blocking ring is rotatable in relation to the sliding sleeve by a certain degree in the circumferential direction between a release position and two locking positions, the locking positions being located on either side of the release position in the circumferential direction,
wherein the blocking ring includes a plurality of axially resilient tabs which are directed radially inward and which bear against the hub body and limit the movement of the blocking ring relative to the hub body in the circumferential direction, and a ring portion which is arranged radially outside of the tabs and which includes a friction surface that rests permanently against a mating friction surface on the clutch body, wherein a permanent frictional force acting between the ring portion of the blocking ring and the clutch body is adjustable by an angle and a length of the axially resilient tabs.

2. The claw-type gearshift according to claim 1, wherein the blocking ring teeth and the sliding sleeve teeth are formed such and located opposite each other in the locking position such that when a shifting force has been applied axially, the sliding sleeve cannot return the blocking ring to the release position.

3. The claw-type gearshift according to claim 1, wherein the blocking ring is fixed to the hub body by the axially resilient tabs which engage by their free ends in coupling grooves in a side surface of the hub body.

4. The claw-type gearshift according to claim 1, wherein the axial ends of the blocking ring teeth and/or the sliding sleeve teeth are either formed to be axially flat or to have axial pointing surfaces having an opening angle perpendicular to a tooth longitudinal direction that is equal to or smaller than 7 degrees.

5. The claw-type gearshift according to claim 1, wherein the claw-type gearshift is for a manual transmission.

6. A claw-type gearshift, comprising:
a sliding sleeve which is adapted to be axially displaced on a hub body and includes an internal toothing having a multitude of sliding sleeve teeth, and a clutch body of a speed change gear, the clutch body including an external toothing which has a multitude of clutch body teeth and is adapted to engage in the internal toothing of the sliding sleeve, and
a blocking ring which has an external toothing and is arranged axially between the hub body and the clutch body and which is fixed to the hub body such that the blocking ring is rotatable in relation to the sliding sleeve by a certain degree in the circumferential direction between a release position and two locking positions, the locking positions being located on either side of the release position in the circumferential direction,
wherein the blocking ring includes a plurality of axially resilient tabs which are directed radially inward and which bear against the hub body and limit the movement of the blocking ring relative to the hub body in the circumferential direction, and a ring portion which is arranged radially outside of the tabs and which includes a friction surface that rests permanently against a mating friction surface on the clutch body,
wherein the friction surface of the blocking ring is formed on a circumferentially encircling V-shaped projection on the ring portion and the mating friction surface of the clutch body is formed on a circumferentially encircling V-shaped depression, the projection and the depression engaging in one another or the friction surface on the blocking ring and the mating friction surface on the clutch body are radially oriented and planar.

7. A method of shifting a claw-type gearshift, the claw-type gearshift including a sliding sleeve adapted to be axially displaced on a hub body, a clutch body of a speed change gear, the clutch body being adapted to move into engagement with the sliding sleeve, and a blocking ring arranged axially between the hub body and the clutch body, a permanent frictional connection between a friction surface of the blocking ring and a mating friction surface of the clutch body being provided, comprising:
switching over of the blocking ring in the circumferential direction to one of two locking positions by the permanent frictional connection between the friction surface of the blocking ring and the mating friction surface of the clutch body;
reducing a difference in speed between the clutch body and the hub body;
applying a shifting force and deflecting the sliding sleeve in the axial direction toward the speed change gear to be shifted;
switching over of the blocking ring to the release position in the circumferential direction by a change in direction of the relative rotational speeds of the clutch body and the hub body, the blocking ring being entrained by the clutch body or the hub body into the release position; and
engaging the internal toothing of the sliding sleeve with the external toothing of the clutch body.

8. The method according to claim 7, wherein the blocking ring exerts a spring force in the axial direction that presses the friction surface against the mating friction surface.

9. The method according to claim 7, wherein the blocking ring blocks an axial further movement of a sliding sleeve irrespective of the shifting force acting, and a relative rotation between the hub body and the clutch body is obtained by a speed difference between the sliding sleeve and the clutch body that builds up after a rotational speed crossing, thus allowing the internal toothing of the sliding sleeve to engage with the external toothing of the clutch body.

10. The method according to claim 7, wherein the reduction of the difference of the speeds of the hub body and the clutch body is effected by a device separate from the blocking ring.

11. The method according to claim 7, wherein the internal toothing of the sliding sleeve includes a multitude of sliding sleeve teeth, and the external toothing of the clutch body has a multitude of clutch body teeth, and
the blocking ring has an external toothing and is arranged axially between the hub body and the clutch body and is fixed to the hub body such that the blocking ring is rotatable in relation to the sliding sleeve by a certain degree in the circumferential direction between a release position and two locking positions, the locking positions being located on either side of the release position in the circumferential direction,
wherein the blocking ring includes a plurality of axially resilient tabs which are directed radially inward, the axially resilient tabs bearing against the hub body and limit the movement of the blocking ring relative to the hub body in the circumferential direction, and a ring portion arranged radially outside of the tabs, the ring portion including a friction surface that rests permanently against a mating friction surface on the clutch body.

* * * * *

UNITED STATES PATENT AND TRADEMARK OFFICE
CERTIFICATE OF CORRECTION

| | | |
|---|---|---|
| PATENT NO. | : 11,906,047 B2 | Page 1 of 1 |
| APPLICATION NO. | : 18/050198 | |
| DATED | : February 20, 2024 | |
| INVENTOR(S) | : Juergen Binder et al. | |

It is certified that error appears in the above-identified patent and that said Letters Patent is hereby corrected as shown below:

On the Title Page

Foreign Priority Information should read:
DE 1020211281695
Filing Date : 2021-10-28

Signed and Sealed this
Thirtieth Day of April, 2024

*Katherine Kelly Vidal*

Katherine Kelly Vidal
*Director of the United States Patent and Trademark Office*